Figure 1:
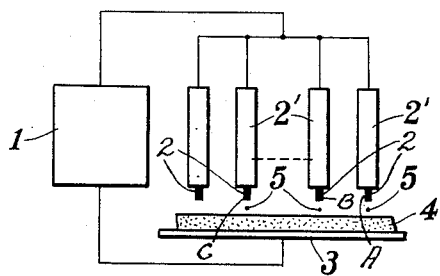

Sept. 18, 1956     SANAI MITO ET AL     2,763,759
APPARATUS FOR ELECTRICALLY PERFORATING
POLYMER SHEET MATERIAL
Filed April 14, 1953

United States Patent Office 2,763,759
Patented Sept. 18, 1956

2,763,759

APPARATUS FOR ELECTRICALLY PERFORATING POLYMER SHEET MATERIAL

Sanai Mito, Osaka, Etsutoshi Takeuchi, Akashi, and Naohiko Fukuoka, Himeji, Japan, assignors to Shibata Gomu Kogyo Kabushiki-Kaisha (Shibata Rubber Industries Limited), Akashi, Japan, a corporation of Japan Application April 14, 1953, Serial No. 348,774

3 Claims. (Cl. 219—19)

This invention relates to an improved method of and apparatus for electrically perforating materials of polymer sheet such as rubber and vinylchloride, and also to the product manufactured by such process. The main principle of this invention is the fact that it facilitates and effects simultaneous multiple electro-perforation with a single voltage power supply.

Polymers such as rubber and vinylchloride, in general, are water repellent as well as gas impermeable. Such gas impermeability inherent to polymers renders them inadequate for manufacturing waterproof shoes and clothing owing to the fact that perspiration or water vapor is unable to escape and deposits in the interior of the article of manufacture. Various attempts have been undertaken to realize gas permeation by electro-perforation. However, simultaneous multiple electro-perforation has heretofore been impossible.

The object of the present invention lies in speedy and economical processing of polymer sheet material to make it gas permeable by the use of a single voltage power supply. Another object is to provide the feature of simultaneous multiple electro-perforation. In realizing these objects, the present invention makes use of a high voltage source, one of whose terminals is connected to a common base plate or roll electrode and the other terminal is connected to multiple pin-pointed electrodes through individual series impedances. The polymer sheet material is brought between the base electrode and the pin-pointed electrodes. The single voltage source induces simultaneous discharge between these sets of electrodes resulting in the processing of an electro-perforated polymer sheet product with the desired gas permeability and water repellent characteristics.

The sheet material which is to be electro-perforated may be covered on both sides with similar sheets, before bringing it between the electrodes, to avoid contamination of the finished sheet by carbonization or generation of colored substances. The sheet material may be pretreated prior to electro-perforation to give it mechanical impressions or distortions on the surface such as by piercing by needles to secure a desired density of perforation to ensure the path of electrical discharge and the desired distribution. In case the sheet material is caused to run between the electrodes for continuous processing, the perforated holes have a tendency to depart from circular shape to oval shape owing to the dragging of the discharge. This may be avoided by blowing air on the pointed electrodes during perforation. Besides the above mentioned mechanical pretreatment of the surface of the sheet to ensure uniform perforation with a desired density, the sheet may be illuminated with pencils of high energy photons such as ultra-violet light or X-rays from underneath the sheet toward the pointed electrodes. This weakens the dielectric strength of the polymer and enables the discharge to occur through predetermined spots subjected to illumination of photons. If further weakening of dielectric strength is desired, the polymer may be mixed with a little amount of dye substance or the like which helps the polymer to be electrically photosensitive. In addition to the above electro-perforation, the surface of the processed sheet material may be exposed to vapor or liquid of water repellent resin in order to secure a superior water repellent, gas permeable sheet.

A mode of carrying out the present invention will be described with reference to the accompanying drawings, in which:

Figure 1 is a circuit diagram illustrating the principle of simultaneous electro-perforation with a single voltage supply according to this invention.

Figure 2:
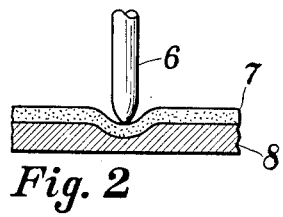
Figure 3:
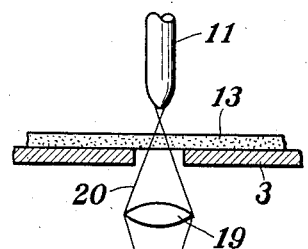
Figure 4:
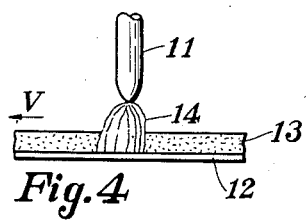
Figure 6:
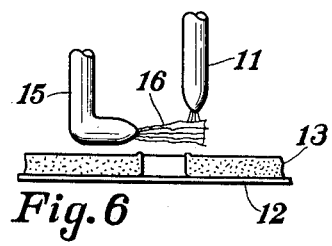
Figure 5:
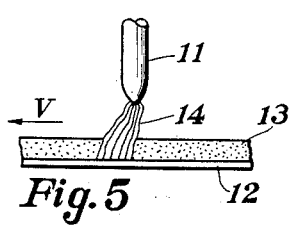
Figure 7:
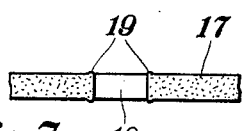

Figure 2 is a sectional view on a magnified scale illustrating the process of impressing mechanical distortion on the sheet material, Figure 3 is a similar view illustrating how the polymer sheet is illuminated by pencils of high energy photons to secure the path of discharge, Figure 4 is another sectional view illustrating the instant of electro-perforation immediately after electric discharge, Figure 5 shows the case when the sheet material is displaced during electric discharge, Figure 6 shows the case when a jet of air is applied between the electrodes in the previous case, and Figure 7 shows in section an improved circular hole obtained by the use of an air jet.

Referring now to Figure 1, 1 may be a high voltage source either of D. C., A. C. (including high frequency), pulsating D. C. or A. C., or any combination thereof. 2 are pointed electrodes with series impedances 2' for controlling current and securing simultaneous discharge. 3 is a common electrode whose configuration may be either a plane plate or a cylindrical roll facing the pointed electrodes. 4 is the polymer sheet material which is to be perforated. 5 are the discharge gaps. In the first place, let the upper ends of the impedance be connected to the high voltage source and assume that none of the gaps 5 are discharging. Here, neglecting the leakage current between the gaps, the voltage at the upper end of the impedances may be deemed equal to that at each of the pointed electrodes. Next, if discharge takes place at any one of the gaps, the voltage between the electrodes of this particular gap drops through its series impedance to a value just sufficient to maintain the discharge. The voltage on the rest of the pointed electrodes, however, remains the same as the source as long as there is no discharge and the internal impedance of the source is sufficiently low compared to the total parallel impedance of the electrodes. Therefore, there would be no or very little effect on the rest of the voltage of the pointed electrodes even after the first discharge takes place at one of the electrodes. Similarly, there would be little effect on the voltage of the electrodes without discharge even when discharge occurs on several electrodes. Thus, if the voltage source has a sufficiently high voltage to excite all the electrodes to discharge, discharge will take place between all the gaps, and this may be deemed practically independent of each other and simultaneous in the light of the present application. In other words, simultaneous electro-perforation is possible with a single voltage supply. In addition to this, another feature such as control of the discharge of each electrode independently may be made possible. For example, one electrode, say B, may be made to lag $t$ seconds in discharge after any electrode, say A, has discharged, and another electrode, C, may be made to discharge $t$ seconds after B's discharge, etc. This may be achieved by proper selection of the series impedances. The available number of such discharging electrodes depends only on the capacity of the voltage supply. If the capacity of the voltage source is large, installation of quite a large number of discharging electrodes is possible.

If the polymer sheet is uniform in its physical properties, and the condition at the discharge gap is equal for all the electrodes, it is possible for all the gaps to begin discharging simultaneously and perform satisfactory electro-perforation.

Better results may be obtained by adding the following operation to the above mentioned method. Fig. 2 illustrates the case where the sheet is impressed with mechanical distortion prior to electric discharge. 6 is the pointed part of the needle which serves to give distortion on the sheet, 7 is the sheet material, and 8 is the base. The distorted portion 7, due to the pressure of the needle on the sheet material, is made weaker electrically than the rest of the area, hence electro-perforation takes place readily through this portion. If such mechanical distortion is given to the sheet material at a desired density and the distorted part is made to come right under the discharging gap, the discharge will take place at a desired surface density.

Other than such mechanical method, control of the path and distribution of discharge may be achieved by illuminating sharp pencils of ultra-violet light from underneath the pointed electrodes beyond the polymer sheet where perforation is to be made. The ultra-violet light may be modulated mechanically or electrically with a proper repetition related to the speed of the sheet which is made to run under the electrodes. Figure 3 is a schematic diagram illustrating an example of how a pencil of ultra-violet light is illuminated. In this figure, 11 is a pointed electrode, 13 a polymer sheet, 3 a base electrode, 18 an ultra-violet source, 19 a lens and 20 an ultra-violet beam. By illuminating high energy photons such as ultra-violet light or X-rays upon polymers, the dielectric strength with respect to electric discharge weakens, and hence, discharge takes place through the portion of the polymer where such rays are applied. If the discharge voltage is desired to be made comparatively low, the polymer may be mixed with a little amount of dye substance to make it electrically photo-sensitive.

If no mechanical distortion or illumination of light is used, discharge will take place where the sheet material is weak due to some nonhomogeneity of the polymer, and hence, the density of perforation becomes uneven, whereby perforation of high density is impossible. This is due to the concentration of discharge at the weak portion from the nearby electrodes, and results in an undesirable excess dimension of the hole. Such defect can be entirely avoided by the impression of mechanical distortion prior to electric discharge, or by illumination of high energy photons during discharge.

Referring to Figures 4 to 6, 11 is the pointed electrode, 12 is a plane electrode, and 13 is the sheet material to be perforated which is supposed to be moving between the electrodes at a constant speed $v$. The electric arc is illustrated by 14. The electric discharge begins at the position shown in Figure 4, and soon completes the piercing of the hole; however, the discharge continues for a while even when the sheet material is moved. Thus, the hole is distorted from its initial circular shape. If air is blown through a nozzle 15 generally perpendicular to the length of the arc soon after discharge occurs, it serves to extinguish the arc and prevents the arc from dragging on, leaving the hole somewhat near to a circular shape. Besides, the blast of air serves to reduce the temperature around the electrodes and suppresses the chemical reaction that would take place in the sheet material at a high temperature.

Figure 7 is a magnified illustration of the section around the hole made nearly circular by the above mentioned process. 18 is the hole around whose circumference is seen the piled up bank consisting of substance produced by chemical reaction or merely by fusion during electric discharge. The physical strength of the sheet as well as the permeability of gas is increased extremely by the formation of such banks.

The following is a list of properties of the perforated sheet which was obtained by the above mentioned process.

I. Test of gas permeability

Thickness of the sheet material_____ 0.10 mm.
Porosity of the sheet_____ 16 per sq. cm.
Mean diameter of the holes_____ 0.05 mm.
Quantity of diffused water vapor through specimen. 2.1 mg. per hour per sq. cm.
Quantity of water vapor absorbed and diffused through sail cloth for reference. 3.3 mg. per hour per sq. cm.

The above quantity of permeated water vapor was measured in the following manner. A thermostat regulated at 25° C. and containing a saturated solution of ammonium chloride is supposed to maintain a relative humidity of 79.3%. A vessel with a window covered with the specimen under test which contained phosphorus pentoxide was placed in the thermostat. The permeability of water vapor was measured by weighing the phosphorus pentoxide at a certain time interval. Here, only the stable and reliable part of the phosphorus pentoxide was used to measure the absorbed quantity of water.

II. Test of water repellency (a) Test against rainfall:
Thickness of specimen___ 0.10 mm.
Density of porosity_____ 16 per sq. cm.
Mean diameter of holes__ 0.05 mm.
After 3 hours' exposure under 100 mm./hr. rain.   No permeation of water was observed.
After 3 hours' exposure under 563 mm./hr. rain.   A little amount of water vapor produced around the holes was noticed to permeate through the sheet.

This result was obtained by artificial rain produced with special nozzles.

(b) Test on hydrostatic pressure:
Thickness of specimen_____ 0.90 mm.
Density of porosity_____ 15 per sq. cm.
Mean diameter of holes_____ 0.04 mm.
Height of water column when the first drop of water permeated.  83 cm.

Here, the water column was raised at the rate of 1 cm. per second.

III. Test of physical strength

| Kind of Specimen | | Thickness, mm. | Tensile strength, kg./cm.² | Elongation, percent | Reduction of tensile strength, percent | Reduction of Elongation, percent |
|---|---|---|---|---|---|---|
| Perpendicular to the Axis of Calender Roll | Before processing | 0.10 | 214.0 | 210.0 | 0 | 0 |
| | Hole diameter: 0.05 mm.; Density: 16/cm.². | 0.10 | 201.3 | 200.0 | 5.9 | 7.3 |
| Parallel to the axis of Calender Roll | Before processing | 0.10 | 203.3 | 200.5 | 0 | 0 |
| | Hole diameter: 0.05 mm.; Density: 16/cm.². | 0.10 | 196.4 | 192.0 | 3.4 | 4.2 |

The foregoing result was obtained by the Schopper Testing Machine.

Results of various tests as shown above indicate the utility of the processed sheet material according to the present invention as footwear, general waterproof wear, fatigue suits, protective covers in agriculture, or wrapping material.

What we claim is:

1. Apparatus for electro-perforating a sheet of polymer material comprising a common electrode, a multiplicity of pointed electrodes pointed toward and spaced from said common electrode by a distance greater than the thickness of said sheet to provide a multiplicity of arc paths between said pointed electrodes and said common electrode, means for intermittently supplying an arcing voltage to said electrodes comprising a source of high voltage, connections from a terminal of said source to said common electrode, connections between each of said pointed electrodes and another terminal of said source, all of said pointed electrodes being connected in parallel with one another, each of said pointed electrodes being electrically connected through an individual impedance to the other terminal of said source, means for moving said sheet between said common electrode and said pointed electrodes, a multiplicity of electro-perforations in said sheet being produced simultaneously while said sheet is being moved between said electrodes by respective electric discharges independent of one another between each pointed electrode and said common electrode, and means for directing a jet of air into each of the arc gaps between the common electrode and the pointed electrodes in a direction generally normal to the length of the gap during electro-perforation and immediately after the completion thereof whereby said discharges are extinguished selectively as said arc gap is lengthened and said sheet is cooled adjacent said electro-perforation to prevent discoloration.

2. Apparatus for electro-perforating a sheet of polymer material comprising a source of high voltage, a common electrode connected to a terminal of said source, a multiplicity of pointed electrodes opposite to and spaced from said common electrode to provide a multiplicity of arc paths between said pointed electrodes and said common electrode, electrical connections between each of said pointed electrodes and another terminal of said source, said pointed electrodes being connected in parallel with one another, each of said pointed electrodes being electrically connected through an individual impedance to the other terminal of said source, means for moving said sheet between said common electrode and said pointed electrodes, means for intermittently projecting high energy photons on said sheet in a multiplicity of localized spots in line with said pointed electrodes to produce a multiplicity of electro-perforations in said sheet by independent discharges from each of said pointed electrodes to said common electrode at the spots on the sheet where said photons are projected, the perforations being thus accurately located by the location of said spots, and means for directing a jet of air into each of the arc gaps between the common electrode in a direction generally normal to the length of the gap and the pointed electrode immediately on the completion of each electro-perforation to avoid elongation of said perforation by the movement of the sheet.

3. Apparatus for electro-perforating a sheet of polymer material comprising a source of high voltage, a common electrode connected to a terminal of said source, a multiplicity of pointed electrodes connected to another terminal of said source and connected in parallel with one another, each of said electrodes having at least one individual impedance connected in series, said electrodes being positioned opposite to and spaced from said common electrode to provide a multiplicity of arc paths between said pointed electrodes and said common electrode, said sheet being disposed between said common electrode and said pointed electrodes and a multiplicity of electro-perforations in said sheet being effected concurrently by respective electric discharges independent of one another between each pointed electrode and said common electrode, all of said discharges passing through said sheet in the same direction.

References Cited in the file of this patent

UNITED STATES PATENTS

| 2,113,714 | Stein | Apr. 12, 1938 |
| 2,379,846 | Wilsey et al. | July 3, 1945 |
| 2,388,069 | Meaker et al. | Oct. 30, 1945 |
| 2,481,048 | Smith | Sept. 6, 1949 |
| 2,501,954 | McKechnie et al. | Mar. 28, 1950 |
| 2,528,157 | Menke | Oct. 31, 1950 |

FOREIGN PATENTS

| 371,165 | Great Britain | Apr. 21, 1932 |